(12) United States Patent
Fu et al.

(10) Patent No.: US 12,287,198 B1
(45) Date of Patent: Apr. 29, 2025

(54) HETERODYNE LASER INTERFEROMETER BASED ON INTEGRATED DUAL POLARIZATION BEAM-SPLITTING ASSEMBLY AND MEASUREMENT METHOD THEREOF

(71) Applicant: HARBIN INSTITUTE OF TECHNOLOGY, Harbin (CN)

(72) Inventors: Haijin Fu, Harbin (CN); Xiaobo Su, Harbin (CN); Liang Yu, Harbin (CN); Pengcheng Hu, Harbin (CN); Xizheng Liu, Harbin (CN); Xin Yang, Harbin (CN)

(73) Assignee: HARBIN INSTITUTE OF TECHNOLOGY, Harbin (CN)

( * ) Notice: Subject to any disclaimer, the term of this patent is extended or adjusted under 35 U.S.C. 154(b) by 0 days.

(21) Appl. No.: 18/595,318

(22) Filed: Mar. 4, 2024

(30) Foreign Application Priority Data

Nov. 17, 2023 (CN) .......................... 202311538445.0

(51) Int. Cl.
*G01B 9/02* (2022.01)
*G01B 9/02001* (2022.01)

(52) U.S. Cl.
CPC ..... *G01B 9/02051* (2013.01); *G01B 9/02007* (2013.01); *G01B 2290/70* (2013.01)

(58) Field of Classification Search
CPC ............ G01B 9/02007; G01B 9/02051; G01B 2290/70
See application file for complete search history.

(56) References Cited

U.S. PATENT DOCUMENTS

| | | | | |
|---|---|---|---|---|
| 5,374,991 | A * | 12/1994 | Atkinson | G01B 9/02081 356/493 |
| 2015/0043004 | A1 * | 2/2015 | Tan | G01B 11/14 356/487 |
| 2020/0386533 | A1 * | 12/2020 | Hu | G01B 9/02007 |
| 2022/0196381 | A1 * | 6/2022 | Yamada | G01J 9/0246 |
| 2023/0417532 | A1 * | 12/2023 | Sun | G01B 9/02007 |

* cited by examiner

*Primary Examiner* — Michael A Lyons

(57) ABSTRACT

A heterodyne laser interferometer and a measurement method based on an integrated dual polarization beam-splitting assembly is provided. Technical points: The first polarization beam splitter and the second polarization beam splitter of the integrated dual polarization beam-splitting assembly are arranged in parallel. The first polarization beam splitter is attached with a first polarizer, a third polarizer, and a first quarter-wave plate; The second polarization beam splitter is attached with a second polarizer, a fourth polarizer, and a second quarter-wave plate; The output optical path of the first quarter-wave plate and the second quarter-wave plate is equipped with target mirrors, while the output optical path of the third quarter-wave plate and the fourth quarter-wave plate is equipped with photo-detectors. The assembly and adjustment of the present invention is more flexible and reduce the processing difficulty and processing error.

5 Claims, 3 Drawing Sheets

HETERODYNE LASER INTERFEROMETER BASED ON INTEGRATED DUAL POLARIZATION BEAM-SPLITTING ASSEMBLY AND MEASUREMENT METHOD THEREOF

CROSS-REFERENCE

This application claims to the benefit of priority from Chinese Application No. 202311538445.0 with a filing date of Nov. 17, 2023. The content of the aforementioned application, including any intervening amendments thereto, are incorporated herein by reference.

TECHNICAL FIELD

The present invention relates to a heterodyne laser interferometer and a measurement method, in particular to a heterodyne laser interferometer based on an integrated dual polarization beam-splitting assembly and a measurement method thereof, relating to the field of laser application technology.

BACKGROUND

Heterodyne interferometers have advantages such as large dynamic range, high-precision, high signal-to-noise ratio, and strong anti-interference ability. At present, high-precision and high stability measurements are required in many fields such as microelectromechanical systems and large-scale integrated circuit manufacturing equipment. Heterodyne interferometers are the most common and most precise testing instruments. With the continuous development of high-end equipment engineering, manufacturing technology and precision engineering have put forward the demand for measurement precision of sub nanometer displacement measurement resolution for external differential interferometers.

The sub nanometer performance of traditional heterodyne interferometers is limited by nanoscale periodic nonlinear errors, which originate from optical aliasing in the interference optical path. In order to reduce periodic errors, domestic and foreign scholars have successively developed different types of spatially separated heterodyne interferometers. Compared with traditional heterodyne laser interferometers, their periodic nonlinear errors are reduced, but considering the requirements of high integration and small volume sensing measurement, etc, at present, heterodyne interferometers have certain limitations.

The heterodyne laser interferometer developed by American scholars Steven R. Gillmer et al. (Development of a Novel Fiber-Coupled Three Degree-of-Freedom Displacement Interferometer. University of Rochester Master Thesis, 2013) has a simple structure, symmetrical optical path, and good thermal stability. However, it only reduces the periodic nonlinear error to 0.5 nm, and is not significantly advanced of traditional heterodyne interferometers.

The heterodyne laser interferometer designed by German scholar Christoph Weichert et al. (A Heterodyne Interferometer with Periodic Nonlinearity Small than ±10 pm. Meas. Sci. Technol., 2012, 23 (9): 094005-094011) has a periodic nonlinear error of less than 10 pm. However, its structure is complex, and it is difficult to customize and integrate components. Moreover, the separation or integration of various optical components leads to an increase in the volume of the heterodyne laser interferometer, and reduces thermal stability.

The heterodyne laser interferometer designed by Zhao Shijie et al. from Tsinghua University (Green laser interferometric metrology system with sub-nanometer periodic nonlinearity [J]. Applied optics, 2016, 55 (11): 3006-3011) reduces the periodic nonlinear error to 0.1 nm. Although various interferometric measurement components of heterodyne laser interferometer designed by Zhao Shijie et al. are integrated into a prism, it has a large volume, complex optical surface design and processing, and poor thermal stability.

In addition, scholars Hu Pengcheng et al. from Harbin Institute of Technology proposed a spatially separated heterodyne laser interferometer in patent CN111442715B, which significantly reduces periodic nonlinear errors and has good thermal stability. However, there are many complex optical components such as corner prisms, which are difficult to integrate and are not suitable for small volume sensing measurement requirements.

In summary, existing spatially separated heterodyne laser interferometers are unable to simultaneously meet the requirements of small sensor head volume, easy integration, good thermal stability, and sub nanometer level periodic nonlinear errors. The comprehensive measurement capability of heterodyne laser interferometers is severely limited.

SUMMARY

In order to overcome the problems that existing spatially separated heterodyne laser interferometers cannot simultaneously meet the requirements of small sensor volume, easy integration, good thermal stability, and sub nanometer periodic nonlinear error, the present invention provides a heterodyne laser interferometer based on an integrated dual polarization beam-splitting assembly and a measurement method thereof. A brief overview of the present invention is described below for providing a basic understanding of certain aspects of the present invention. It should be understood that this overview is not an exhaustive overview of the present invention, and it is not intended to determine the key or important parts of the present invention, nor is it intended to limit the scope of the present invention.

The first technical solution of the present invention:

A heterodyne laser interferometer based on an integrated dual polarization beam-splitting assembly, including:
- a laser light source, used to provide two spatially separated beams with different frequencies; the two spatially separated beams with different frequencies are defined as a first input beam with frequency $f_1$ and a second input beam with frequency $f_2$, respectively; the first input beam and the second input beam are polarized light or non-polarized light;
- an output path of the laser light source is provided with an integrated dual polarization beam-splitting assembly, the first input beam is incident on the integrated dual polarization beam-splitting assembly to divide into a first measurement beam and a first reference beam, and the second input beam is incident on the integrated dual polarization beam-splitting assembly to divide into a second measurement beam and a second reference beam;
- the integrated dual polarization beam-splitting assembly includes a first polarization beam splitter, a second polarization beam splitter, a first quarter-wave plate, a second quarter-wave plate, a third quarter-wave plate, a fourth quarter-wave plate, a half-wave plate, a first polarizer, a second polarizer, a third polarizer, and a fourth polarizer;

the first polarization beam splitter and the second polarization beam splitter are arranged in parallel at left and right sides, and a half-wave plate is arranged between adjacent end faces;

a front end face of the first polarization beam splitter is attached with the first polarizer, a left end face of the first polarization beam splitter is attached with the third polarizer, a rear end face of the first polarization beam splitter is attached with the first quarter-wave plate, and the third polarizer is attached with the third quarter-wave plate;

a front end face of the second polarization beam splitter is attached with the second polarizer, a right end face of the second polarization beam splitter is attached with the fourth polarizer, a rear end face of the second polarization beam splitter is attached with a second quarter-wave plate, and the fourth polarizer is attached with the quarter-wave plate;

an output optical path of the first quarter-wave plate is provided with a first target mirror;

an output optical path of the second quarter-wave plate is provided with a second target mirror;

an output optical path of the third quarter-wave plate is provided with a first photodetector;

an output optical path of the fourth quarter-wave plate is provided with a second photodetector.

Further, polarization axis directions of the first polarizer and the second polarizer are both non horizontal and non vertical, and the polarization axis directions of the third polarizer and the fourth polarizer are both horizontal; fast axis directions of the first quarter-wave plate and the second quarter-wave plate are parallel, also not parallel and not perpendicular to a horizontal transmission polarization direction of the first polarization beam splitter or the second polarization beam splitter.

Further, the first polarization beam splitter and the second polarization beam splitter have the same size and are symmetrically mirrored with the center respect to the half-wave plate.

Further, the first measurement beam and the second reference beam, as well as the second measurement beam and the first reference beam, have equal travel path lengths in the integrated dual polarization beam-splitting assembly.

The second technical solution of the present invention:

A measurement method for the heterodyne laser interferometer based on an integrated dual polarization beam-splitting assembly, wherein the heterodyne laser interferometer is the heterodyne laser interferometer based on the integrated dual polarization beam-splitting assembly as described in the first technical solution;

the measurement method includes the following steps:

the first input beam transmitted through the first polarizer becomes horizontally polarized light, and the second input beam transmitted through the second polarizer becomes horizontally polarized light;

after the first input beam is incident on the first polarization beam splitter, a transmitted beam of the first input beam forms a first measurement beam, and a reflected beam of the first input beam forms a first reference beam;

after the second input beam is incident on the second beam splitter, a transmitted beam of the second input beam forms a second measurement beam, and a reflected beam of the second input beam forms a second reference beam;

the first measurement beam continues to transmit under polarization state transformation of the first quarter-wave plate and reaches the first target mirror, then carries a Doppler frequency shift and is output by reflected at the first polarization beam splitter;

the second measurement beam continues to transmit under polarization state transformation of the second quarter-wave plate and reaches the second target mirror, then carries a Doppler frequency shift and is output by reflected at the second polarization beam splitter;

at the same time, the first reference beam is transmitted and output through the first polarization beam splitter under polarization state transformation of the half-wave plate;

the second reference beam is transmitted and output through the second polarization beam splitter under the polarization state transformation of the half-wave plate, and the frequencies of the first reference beam and the second reference beam remain unchanged;

at least a portion of the output first measurement beam and the output second reference beam recombine to form a first interference signal in an output travel path, and at least a portion of the first reference beam and the second measurement beam recombine to form a second interference signal in the output travel path;

finally, the first photodetector receives the first interference signal, the second photodetector receives the second interference signal, and position change information of target plane mirrors at different degrees of freedom is obtained after conducting signal processing on the first interference signal and the second interference signal.

The third technical solution of the present invention:

A heterodyne laser interferometer based on an integrated dual polarization beam-splitting assembly, including:

a laser light source, used to provide two spatially separated beams of different frequencies; the two spatially separated beams with different frequencies are defined as the first input beam with frequency $f_1$ and the second input beam with frequency $f_2$, respectively; the first input beam and the second input beam are polarized light, and the first input beam and the second input beam are polarized incidence and incident in a horizontal direction;

an output path of the laser light source is provided with an integrated dual polarization beam-splitting assembly;

the integrated dual polarization beam-splitting assembly includes a first polarization beam splitter, a second polarization beam splitter, a first quarter-wave plate, a second quarter-wave plate, a third quarter-wave plate, a fourth quarter-wave plate, a half-wave plate, a third polarizer, and a fourth polarizer;

the first polarization beam splitter and the second polarization beam splitter are arranged in parallel at left and right sides, and a half-wave plate is arranged between adjacent end faces;

a left end face of the first polarization beam splitter is attached with the third polarizer, a rear end face of the first polarization beam splitter is attached with the first quarter-wave plate, and the third polarizer is attached with the third quarter-wave plate;

a right end face of the second polarization beam splitter is attached with the fourth polarizer, a rear end face of the second polarization beam splitter is attached with a second quarter-wave plate, and the fourth polarizer is attached with the quarter-wave plate;

an output optical path of the first quarter-wave plate is provided with a first target mirror;

an output optical path of the second quarter-wave plate is provided with a second target mirror;

an output optical path of the third quarter-wave plate is provided with a first photodetector;

an output optical path of the fourth quarter-wave plate is provided with a second photodetector.

Further, polarization axis directions of the third polarizer and the fourth polarizer are both non horizontal and non vertical; fast axis directions of the first quarter-wave plate and the second quarter-wave plate are parallel, also not parallel and not perpendicular to horizontal transmission polarization directions of the first polarization beam splitter or the second polarization beam splitter.

Further, the first polarization beam splitter and the second polarization beam splitter have the same size and are symmetrically mirrored with the center respect to the half-wave plate;

Further, the first measurement beam and the second reference beam, as well as the second measurement beam and the first reference beam, have equal travel path lengths in the integrated dual polarization beam-splitting assembly;

The fourth technical solution of the present invention:

A measurement method for a heterodyne laser interferometer based on an integrated dual polarization beam-splitting assembly, wherein the heterodyne laser interferometer is the heterodyne laser interferometer based on the integrated dual polarization beam-splitting assembly as descried in the third technical solution;

the measurement method includes the following steps:

after the first input beam is incident on the first polarization beam splitter, a transmitted beam of the first input beam forms a first measurement beam, and a reflected beam of the first input beam forms a first reference beam;

after the second input beam is incident on the second beam splitter, a transmitted beam of the second input beam forms a second measurement beam, and a reflected beam of the second input beam forms a second reference beam;

the first measurement beam continues to transmit under polarization state transformation of the first quarter-wave plate and contacts the first target mirror, then carries a Doppler frequency shift and reflects an output at the first polarization beam splitter;

the second measurement beam continues to transmit under polarization state transformation of the second quarter-wave plate and contacts the second target mirror, then carries a Doppler frequency shift and reflects an output at the second polarization beam splitter;

at the same time, the first reference beam is transmitted and output through the first polarization beam splitter under polarization state transformation of the half-wave plate;

the second reference beam is transmitted and output through the second polarization beam splitter under the polarization state transformation of the half-wave plate, and the frequencies of the first reference beam and the second reference beam remain unchanged;

at least a portion of the output first measurement beam and the output second reference beam recombine to form a first interference signal in an output travel path, and at least a portion of the first reference beam and the second measurement beam recombine to form the second interference signal in the output travel path;

finally, the first photodetector receives the first interference signal, the second photodetector receives the second interference signal, and position change information of target plane mirrors at different degrees of freedom is obtained after conducting signal processing on the first interference signal and the second interference signal.

The advantageous effects of the present invention are reflected in:

(1) In the present invention, the main body of the heterodyne laser interferometer includes two spatially symmetric polarization beam splitters and other polarization elements. On the one hand, the volume is smaller compared to the current spatially separated heterodyne interferometer, and on the other hand, it is easy to integrate and assemble. Compared to the current spatially separated heterodyne interferometer, the design and installation are more flexible and reduce processing difficulty and errors.

(2) In the present invention, the first and second incident beams of the heterodyne laser interferometer are spatially separated before the final interference, and multiple polarization elements suppress optical aliasing, reducing periodic nonlinear errors to within 0.1 nanometers. Meanwhile, the first measurement beam and the second reference beam, as well as the second measurement beam and the first reference beam, have equal travel path lengths in the integrated dual polarization beam-splitting assembly, so that the theoretical thermal drift of the heterodyne laser interferometer is zero, with good structural thermal stability. In summary, the heterodyne laser interferometer of the present invention combines the above advantages compared to other spatially separated heterodyne laser interferometers and is more suitable for applications with narrow displacement measurement space.

Figure 1:
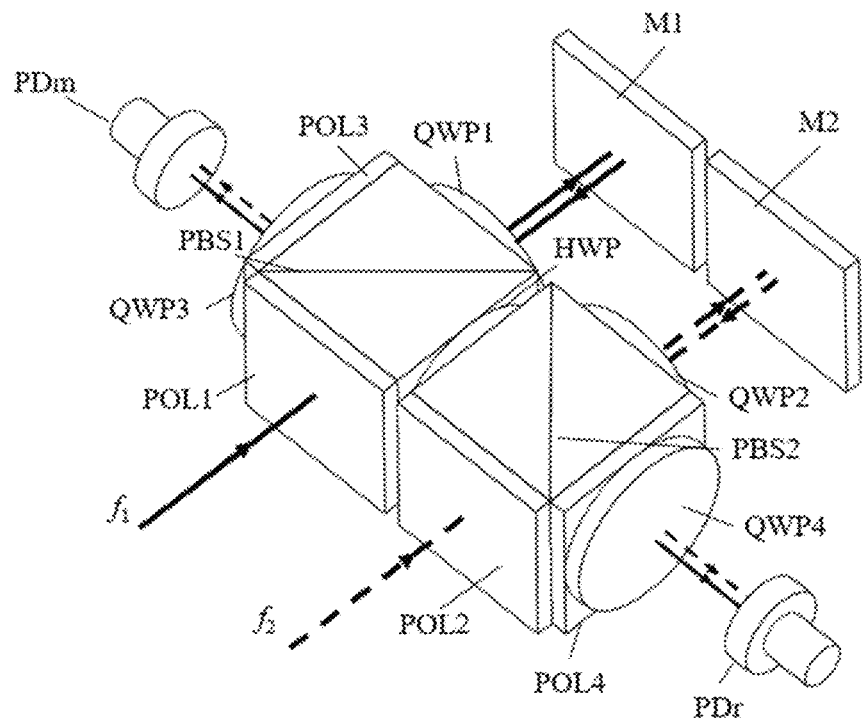
FIG. 1 is a three-dimensional schematic diagram of the structure of a heterodyne laser interferometer based on an integrated dual polarization beam-splitting assembly in Embodiment 1.
Figure 2:
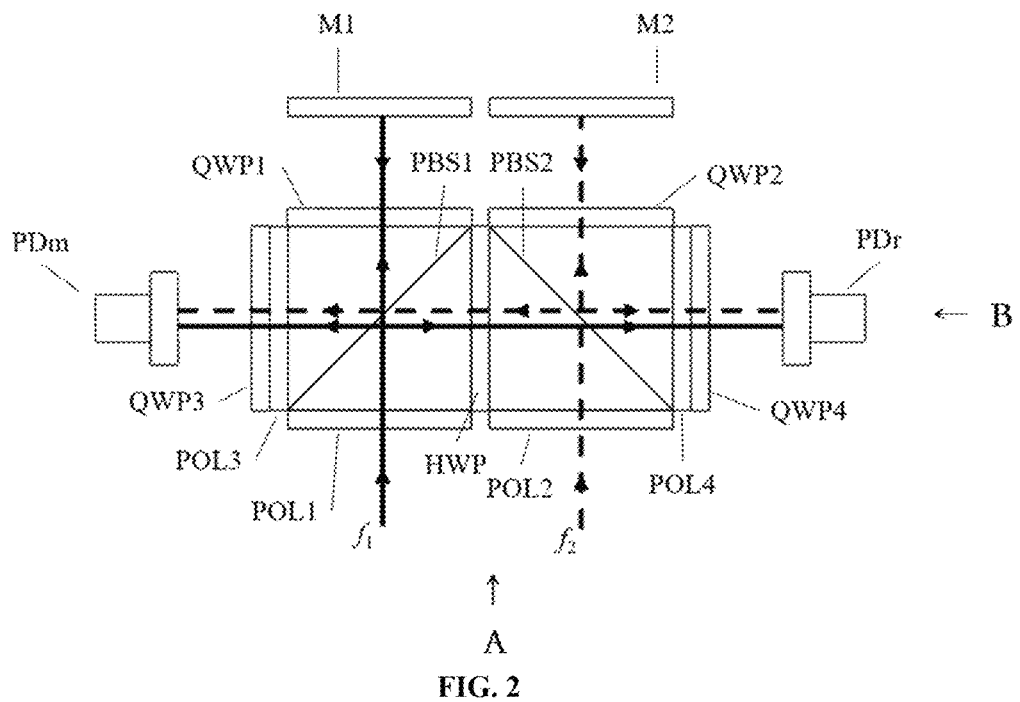
FIG. 2 is a schematic diagram of the optical path of a heterodyne laser interferometer based on an integrated dual polarization beam-splitting assembly in Embodiment 2.
Figure 3:
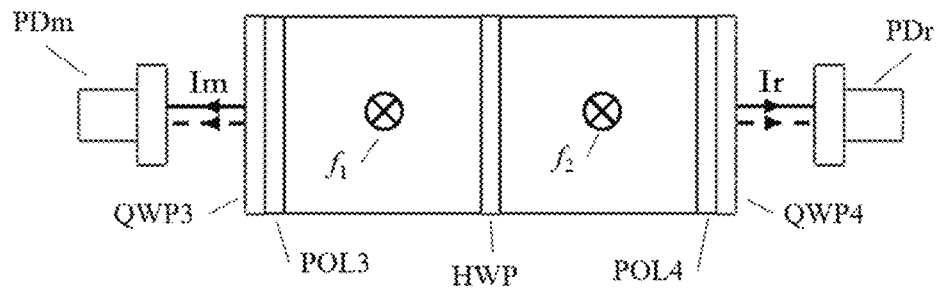
FIG. 3 is the A-direction view of FIG. 2.
Figure 4:
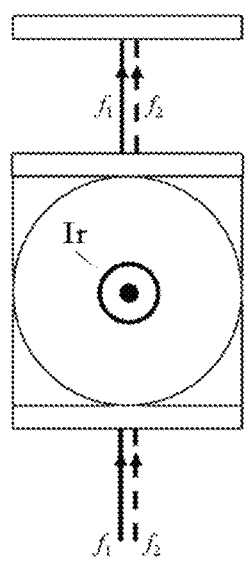
FIG. 4 is the B-direction view of FIG. 2.

Illustration of the reference numbers in the drawings:

PBS1: first polarization beam splitter;
PBS2: second polarization beam splitter;
QWP1: first quarter-wave plate;
QWP2: second quarter-wave plate;
QWP3: third quarter-wave plate;
QWP4: fourth quarter-wave plate;
HWP: half-wave plate;
POL1: first polarizer;
POL2: second polarizer;
POL3: third polarizer;
POL4: fourth polarizer;
M1: first target mirror;
M2: second target mirror;
F1: first input beam with a frequency $f_1$;
F2: second input beam with a frequency $f_2$;

Im: first interference signal;
Ir: second interference signal;
PDm: first photodetector;
PDr: second photodetector.

DETAILED DESCRIPTION OF THE EMBODIMENTS

To make the objective, technical solution, and advantages of the present invention clearer, the specific embodiments shown in the accompanying drawings will be used to describe the present invention. However, it should be understood that these descriptions are only illustrative and not intended to limit the scope of the present invention. Furthermore, in the following illustration, the description of the well-known structure and technology has been omitted to avoid unnecessary confusion with the concepts of the present invention. It should also be understood that, unless otherwise specified or pointed out, the terms "first", "second", "third" and other descriptions in the manual are only used to distinguish the various components, elements, steps, etc. in the manual, rather than to represent the logical or sequential relationships between the components, elements, steps, etc.

Embodiment 1, combined with FIG. 1 to FIG. 4 to illustrate this embodiment, a heterodyne laser interferometer based on an integrated dual polarization beam-splitting assembly is provided in this embodiment, which includes: a laser light source, used to provide two spatially separated beams with different frequencies; the two spatially separated beams with different frequencies are defined as a first input beam with frequency $f_1$ and a second input beam with frequency $f_2$, respectively; the first input beam and the second input beam need not be polarized light; an output path of the laser light source is provided with an integrated dual polarization beam-splitting assembly, the first input beam is incident on the integrated dual polarization beam-splitting assembly to divide into a first measurement beam and a first reference beam, and the second input beam is incident on the integrated dual polarization beam-splitting assembly to divide into a second measurement beam and a second reference beam; the integrated dual polarization beam-splitting assembly includes a first polarization beam splitter PBS1, a second polarization beam splitter PBS2, a first quarter-wave plate QWP1, a second quarter-wave plate QWP2, a third quarter-wave plate QWP3, a fourth quarter-wave plate QWP4, a half-wave plate HWP, a first polarizer POL1, a second polarizer POL2, a third polarizer POL3, and a fourth polarizer POL4; the first polarization beam splitter PBS1 and the second polarization beam splitter PBS2 are arranged in parallel at left and right sides, and a half-wave plate HWP is arranged between adjacent end faces; a front end face of the first polarization beam splitter PBS1 is attached with the first polarizer POL1, a left end face of the first polarization beam splitter PBS1 is attached with the third polarizer POL3, a rear end face of the first polarization beam splitter PBS1 is attached with the first quarter-wave plate QWP1, and the third polarizer POL3 is attached with the third quarter-wave plate QWP3; a front end face of the second polarization beam splitter PBS2 is attached with the second polarizer POL2, a right end face of the second polarization beam splitter PBS2 is attached with the fourth polarizer POL4, a rear end face of the second polarization beam splitter PBS2 is attached with a second quarter-wave plate QWP2, and the fourth polarizer POL4 is attached with the quarter-wave plate QWP4; an output optical path of the first quarter-wave plate QWP1 is provided with a first target mirror M1; an output optical path of the second quarter-wave plate QWP2 is provided with a second target mirror M2; an output optical path of the third quarter-wave plate QWP3 is provided with a first photodetector PDm; an output optical path of the fourth quarter-wave plate QWP4 is provided with a second photodetector PDr. The polarization axis directions of the first polarizer POL1 and the second polarizer POL2 are both non horizontal and non vertical, and the polarization axis directions of the third polarizer POL3 and the fourth polarizer POL4 are both horizontal; fast axis directions of the first quarter-wave plate QWP1 and the second quarter-wave plate QWP2 are parallel, and horizontal transmission polarization directions of the first polarization beam splitter PBS1 or the second polarization beam splitter PBS2 is not parallel and not perpendicular to each other. The first polarization beam splitter PBS1 and the second polarization beam splitter PBS2 have the same size and are symmetrically mirrored with respect to the half-wave plate HWP. The first measurement beam and the second reference beam, as well as the second measurement beam and the first reference beam, have equal travel path lengths in the integrated dual polarization beam-splitting assembly. The first quarter-wave plate QWP1 and the second quarter-wave plate QWP2 are respectively placed opposite to the first transmission surfaces of the first input beam and the second input beam, and the first and second measurement beams can pass through the wave plates completely, while the first and second measurement beams can pass through the polarizers completely.

Embodiment 2, combined with FIG. 1 to FIG. 4 to illustrate this embodiment, a measurement method for the heterodyne laser interferometer based on an integrated dual polarization beam-splitting assembly is provided in this embodiment, wherein the heterodyne laser interferometer is the heterodyne laser interferometer based on the integrated dual polarization beam-splitting assembly as described in the Embodiment 1.

The measurement method includes the following steps:

The first input beam transmitted through the first polarizer POL1 becomes horizontally polarized light, and the second input beam transmitted through the second polarizer POL2 becomes horizontally polarized light; after the first input beam is incident on the first polarization beam splitter PBS1, a transmitted beam of the first input beam forms a first measurement beam, and a reflected beam of the first input beam forms a first reference beam; after the second input beam is incident on the second beam splitter PBS2, a transmitted beam of the second input beam forms a second measurement beam, and a reflected beam of the second input beam forms a second reference beam; the first measurement beam continues to transmit under polarization state transformation of the first quarter-wave plate QWP1 and reaches the first target mirror M1, then carries a Doppler frequency shift and is output by reflected at the first polarization beam splitter PBS1; the second measurement beam continues to transmit under polarization state transformation of the second quarter-wave plate QWP2 and reaches the second target mirror M2, then carries a Doppler frequency shift and is output by reflected at the second polarization beam splitter PBS2; at the same time, the first reference beam is transmitted and outputted through the first polarization beam splitter PBS1 under polarization state transformation of the half-wave plate HWP; the second reference beam is transmitted and outputted through the second polarization beam splitter PBS2 under the polarization state transformation of the half-wave plate HWP, and the frequencies of the first reference beam and the second reference beam remain unchanged; at least a portion of the output first measurement beam and the output second reference beam recombine to form a first interference signal Im in an output travel path, and at least a portion of the first reference beam and the second measurement beam recombine to form a second interference signal Ir in the output travel path; finally, the first photodetector PDm receives the first interference signal Im, the second photodetector PDr receives the second interference signal Ir, and position change information of target plane mirrors at different degrees of freedom is obtained after conducting signal processing on the first interference signal Im and the second interference signal Ir.

Figure 5:
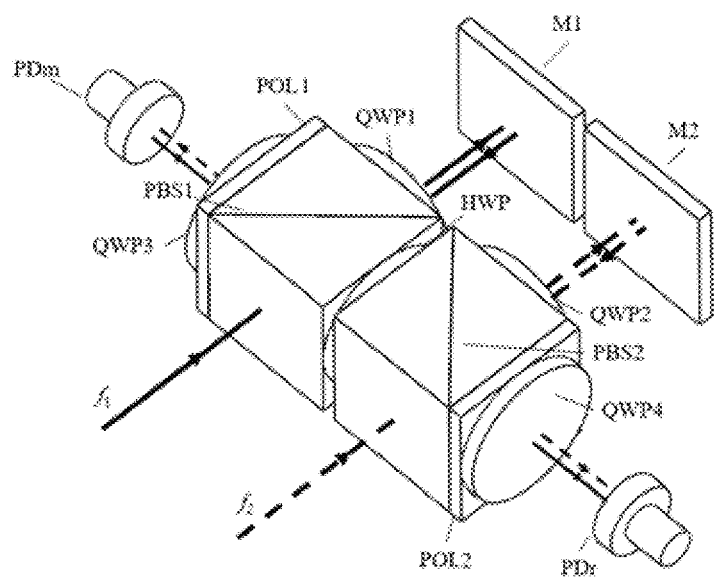
FIG. 5 is a three-dimensional schematic diagram of the structure of a heterodyne laser interferometer based on an integrated dual polarization beam-splitting assembly in Embodiment 3.

Embodiment 3, combined with FIG. 5 to illustrate this embodiment, a heterodyne laser interferometer based on an integrated dual polarization beam-splitting assembly is provided in this embodiment, which includes: a laser light source, used to provide two spatially separated beams of different frequencies; the two spatially separated beams with different frequencies are defined as the first input beam with frequency $f_1$ and the second input beam with frequency $f_2$, respectively; the first input beam and the second input beam are polarized light, and the first input beam and the second input beam are polarized incidence and incident in a horizontal direction; an output path of the laser light source is provided with an integrated dual polarization beam-splitting assembly; the integrated dual polarization beam-splitting assembly includes a first polarization beam splitter PBS1, a second polarization beam splitter PBS2, a first quarter-wave plate QWP1, a second quarter-wave plate QWP2, a third quarter-wave plate QWP3, a fourth quarter-wave plate QWP4, a half-wave plate HWP, a first polarizer POL1, and a second polarizer POL2; the first polarization beam splitter PBS1 and the second polarization beam splitter PBS2 are arranged in parallel at left and right sides, and a half-wave plate HWP is arranged between adjacent end faces; a left end face of the first polarization beam splitter PBS1 is attached with the first polarizer POL1, a rear end face of the first polarization beam splitter PBS1 is attached with the first quarter-wave plate QWP1, and the first polarizer POL1 is attached with the third quarter-wave plate QWP3; a right end face of the second polarization beam splitter PBS2 is attached with the second polarizer POL2, a rear end face of the second polarization beam splitter PBS2 is attached with a second quarter-wave plate QWP2, and the second polarizer POL2 is attached with the quarter-wave plate QWP4; an output optical path of the first quarter-wave plate QWP1 is provided with a first target mirror M1; an output optical path of the second quarter-wave plate QWP2 is provided with a second target mirror M2; an output optical path of the third quarter-wave plate QWP3 is provided with a first photodetector PDm; an output optical path of the fourth quarter-wave plate QWP4 is provided with a second photodetector PDr. The polarization axis directions of the first polarizer POL1 and the second polarizer POL2 are both non horizontal and non vertical; fast axis directions of the first quarter-wave plate QWP1 and the second quarter-wave plate QWP2 are parallel, and the horizontal transmission polarization direction of the first polarization beam splitter PBS1 or the second polarization beam splitter PBS2 is not parallel and not perpendicular. The first polarization beam splitter PBS1 and the second polarization beam splitter PBS2 have the same size and are symmetrically mirrored with respect to the half-wave plate HWP. The first measurement beam and the second reference beam, as well as the second measurement beam and the first reference beam, have equal travel path lengths in the integrated dual polarization beam-splitting assembly.

Embodiment 4, combined with FIG. 5 to illustrate this embodiment, a measurement method for a heterodyne laser interferometer based on an integrated dual polarization beam-splitting assembly, wherein the heterodyne laser interferometer is the heterodyne laser interferometer based on the integrated dual polarization beam-splitting assembly as described in Embodiment 4.

The measurement method includes the following steps:

After the first input beam is incident on the first polarization beam splitter PBS1, a transmitted beam of the first input beam forms a first measurement beam, and a reflected beam of the first input beam forms a first reference beam; after the second input beam is incident on the second beam splitter (PBS2), a transmitted beam of the second input beam forms a second measurement beam, and a reflected beam of the second input beam forms a second reference beam; the first measurement beam continues to transmit under polarization state transformation of the first quarter-wave plate QWP1 and reaches the first target mirror M1, then carries a Doppler frequency shift and is output by reflected at the first polarization beam splitter PBS1; the second measurement beam continues to transmit under polarization state transformation of the second quarter-wave plate QWP2 and reaches the second target mirror M2, then carries a Doppler frequency shift and is output by reflected at the second polarization beam splitter PBS2; at the same time, the first reference beam is transmitted and outputted through the first polarization beam splitter PBS1 under polarization state transformation of the half-wave plate HWP; the second reference beam is transmitted and outputted through the second polarization beam splitter PBS2 under the polarization state transformation of the half-wave plate HWP, and the frequencies of the first reference beam and the second reference beam remain unchanged; at least a portion of the output first measurement beam and the output second reference beam recombine to form a first interference signal Im in an output travel path, and at least a portion of the first reference beam and the second measurement beam recombine to form the second interference signal Ir in the output travel path; finally, the first photodetector PDm receives the first interference signal Im, the second photodetector PDr receives the second interference signal Ir, and position change information of target plane mirrors at different degrees of freedom is obtained after conducting signal processing on the first interference signal Im and the second interference signal Ir.

In the above embodiment, the periodic nonlinear error of the heterodyne interferometer is derived as follows:

$$PNL = \frac{\lambda}{2\pi N} \cdot \frac{\Gamma_N}{\Gamma_s}$$

In the formula, $\lambda$ is the wavelength of the laser light source, which is 632.8 nm; N is the optical subdivision number, and the optical structure of the interferometer has an optical subdivision number of 2; $\Gamma_N$ is the peak amplitude of a periodic nonlinear error signal, and $\Gamma_S$ is the peak amplitude of an interference signal, which are expressed in decibels in a spectrum analyzer.

When the spectrum analyzer reads the interference signal amplitude as $\Gamma_S$dB and the nonlinear signal amplitude as $\Gamma_N$dB, the periodic nonlinear error is:

$$PNL = \frac{\lambda}{2\pi N} \cdot \frac{\Gamma_N}{\Gamma_S} = \frac{632.8}{2\pi \times 2} \cdot 10^{\left(\frac{\Gamma_S - \Gamma_N}{20}\right)} nm$$

Figure 6:
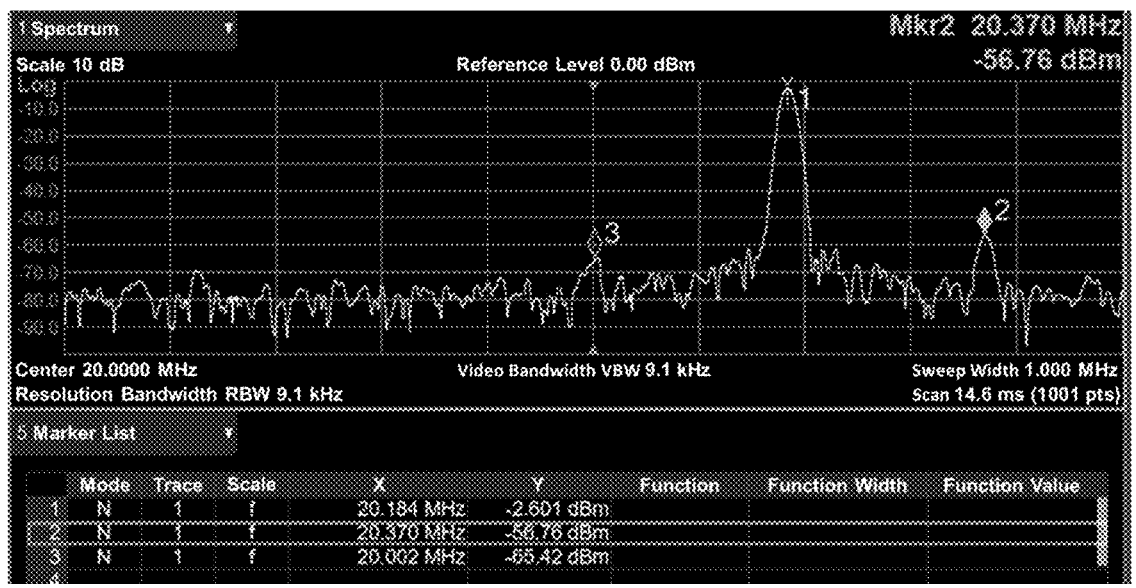
FIG. 6 shows the measurement results of the interference signal amplitude spectrum.

Setting the target mirror to move at an uniform speed, and the test results of spectrum analyzer are shown in FIG. 6.

According to the measurement results of the interference signal amplitude spectrum, when the spectrum analyzer reads the interference signal amplitude as −2.601 dB, the 0-order nonlinear signal amplitude as −65.42 dB, and the ±1st order nonlinear signal amplitude as −56.76 dB, the 0-order periodic nonlinear error is 0.036 nm, and the ±1st order periodic nonlinear error is 0.099 nm. In summary, the periodic nonlinear error of the heterodyne interferometer is much lower than that of traditional heterodyne interferometers in the sub nanometer index.

The above embodiments provide further detailed illustration of the objective, technical solution, and advantageous effects of the present application. It should be understood that the above are only embodiments of the present application and are not intended to limit the scope of the present application. Any modifications, equivalent substitutions, improvements, etc. made based on the technical solution of the present application should be included in the scope of the present application.

What is claimed is:

1. A heterodyne laser interferometer based on an integrated dual polarization beam-splitting assembly, comprising:
    a laser light source, used to provide two spatially separated beams with different frequencies;
    the two spatially separated beams with different frequencies are defined as a first input beam with frequency $f_1$ and a second input beam with frequency $f_2$, respectively; the first input beam and the second input beam are polarized light, or the first input beam and the second input beam are non-polarized light;
    an output path of the laser light source is provided with an integrated dual polarization beam-splitting assembly, the first input beam is incident on the integrated dual polarization beam-splitting assembly to divide into a first measurement beam and a first reference beam, and the second input beam is incident on the integrated dual polarization beam-splitting assembly to divide into a second measurement beam and a second reference beam;
    the integrated dual polarization beam-splitting assembly comprises a first polarization beam splitter (PBS1), a second polarization beam splitter (PBS2), a first quarter-wave plate (QWP1), a second quarter-wave plate (QWP2), a third quarter-wave plate (QWP3), a fourth quarter-wave plate (QWP4), a half-wave plate (HWP), a first polarizer (POL1), a second polarizer (POL2), a third polarizer (POL3), and a fourth polarizer (POL4);
    the first polarization beam splitter (PBS1) and the second polarization beam splitter (PBS2) are arranged in parallel at left and right sides, and the half-wave plate (HWP) is arranged between the adjacent end faces;
    a front end face of the first polarization beam splitter (PBS1) is attached with the first polarizer (POL1), a left end face of the first polarization beam splitter (PBS1) is attached with the third polarizer (POL3), a rear end face of the first polarization beam splitter (PBS1) is attached with the first quarter-wave plate (QWP1), and the third polarizer (POL3) is attached with the third quarter-wave plate (QWP3);
    a front end face of the second polarization beam splitter (PBS2) is attached with the second polarizer (POL2), a right end face of the second polarization beam splitter (PBS2) is attached with the fourth polarizer (POL4), a rear end face of the second polarization beam splitter (PBS2) is attached with a second quarter-wave plate (QWP2), and the fourth polarizer (POL4) is attached with the quarter-wave plate (QWP4);
    an output optical path of the first quarter-wave plate (QWP1) is provided with a first target mirror (M1);
    an output optical path of the second quarter-wave plate (QWP2) is provided with a second target mirror (M2);
    an output optical path of the third quarter-wave plate (QWP3) is provided with a first photodetector (PDm);
    an output optical path of the fourth quarter-wave plate (QWP4) is provided with a second photodetector (PDr);
    polarization axis directions of the first polarizer (POL1) and the second polarizer (POL2) are both non horizontal and non vertical, and the polarization axis directions of the third polarizer (POL3) and the fourth polarizer (POL4) are both horizontal; fast axis directions of the first quarter-wave plate (QWP1) and the second quarter-wave plate (QWP2) are parallel, and the fast axis directions of the first quarter-wave plate (QWP1) and the second quarter-wave plate (QWP2) are not parallel and not perpendicular to a horizontal transmission polarization direction of the first polarization beam splitter (PBS1) or the second polarization beam splitter (PBS2);
    the first polarization beam splitter (PBS1) and the second polarization beam splitter (PBS2) have the same size and are symmetrically mirrored with a center with respect to the half-wave plate (HWP).

2. The heterodyne laser interferometer based on an integrated dual polarization beam-splitting assembly according to claim 1, wherein the first measurement beam, the second reference beam, the second measurement beam, and the first reference beam have equal travel path lengths in the integrated dual polarization beam-splitting assembly.

3. A measurement method for the heterodyne laser interferometer based on an integrated dual polarization beam-splitting assembly, wherein the heterodyne laser interferometer is the heterodyne laser interferometer based on the integrated dual polarization beam-splitting assembly according to claim 1;
    the measurement method comprises the following steps:
    the first input beam transmitted through the first polarizer (POL1) becomes horizontally polarized light, and the second input beam transmitted through the second polarizer (POL2) becomes horizontally polarized light;
    after the first input beam is incident on the first polarization beam splitter (PBS1), a transmitted beam of the first input beam forms a first measurement beam, and a reflected beam of the first input beam forms a first reference beam;
    after the second input beam is incident on the second beam splitter (PBS2), a transmitted beam of the second input beam forms a second measurement beam, and a reflected beam of the second input beam forms a second reference beam;
    the first measurement beam continues to transmit under polarization state transformation of the first quarter-wave plate (QWP1) and reaches the first target mirror (M1), then carries a Doppler frequency shift and is output by reflection the first polarization beam splitter (PBS1);
    the second measurement beam continues to transmit under polarization state transformation of the second quarter-wave plate (QWP2) and reaches the second target mirror (M2), then carries a Doppler frequency shift and is output by reflection at the second polarization beam splitter (PBS2);

at the same time, the first reference beam is transmitted and output through the first polarization beam splitter (PBS1) under polarization state transformation of the half-wave plate (HWP);

the second reference beam is transmitted and output through the second polarization beam splitter (PBS2) under the polarization state transformation of the half-wave plate (HWP), and the frequencies of the first reference beam and the second reference beam remain unchanged;

at least a portion of the output first measurement beam and the output second reference beam recombine to form a first interference signal (Im) in output travel paths, and at least a portion of the first reference beam and the second measurement beam recombine to form a second interference signal (Ir) in the output travel paths;

finally, the first photodetector (PDm) receives the first interference signal (Im), the second photodetector (PDr) receives the second interference signal (Ir), and position change information of target plane mirrors at different degrees of freedom is obtained after conducting signal processing on the first interference signal (Im) and the second interference signal (Ir).

4. A heterodyne laser interferometer based on an integrated dual polarization beam-splitting assembly, comprising:

a laser light source, used to provide two spatially separated beams of different frequencies; the two spatially separated beams with different frequencies are defined as the first input beam with frequency $f_1$ and the second input beam with frequency $f_2$, respectively; the first input beam and the second input beam are polarized light, and the first input beam and the second input beam are polarized incidence and incident in a horizontal direction;

an output path of the laser light source is provided with an integrated dual polarization beam-splitting assembly;

the integrated dual polarization beam-splitting assembly comprises a first polarization beam splitter (PBS1), a second polarization beam splitter (PBS2), a first quarter-wave plate (QWP1), a second quarter-wave plate (QWP2), a third quarter-wave plate (QWP3), a fourth quarter-wave plate (QWP4), a half-wave plate (HWP), a first polarizer (POL1), and a second polarizer (POL2);

the first polarization beam splitter (PBS1) and the second polarization beam splitter (PBS2) are arranged in parallel at left and right sides, and the half-wave plate (HWP) is arranged between the adjacent end faces;

a left end face of the first polarization beam splitter (PBS1) is attached with the third polarizer (POL3), a rear end face of the first polarization beam splitter (PBS1) is attached with the first quarter-wave plate (QWP1), and the first polarizer (POL1) is attached with the third quarter-wave plate (QWP3);

a right end face of the second polarization beam splitter (PBS2) is attached with the second polarizer (POL2), a rear end face of the second polarization beam splitter (PBS2) is attached with a second quarter-wave plate (QWP2), and the fourth polarizer (POL4) is attached with the quarter-wave plate (QWP4);

an output optical path of the first quarter-wave plate (QWP1) is provided with a first target mirror (M1);

an output optical path of the second quarter-wave plate (QWP2) is provided with a second target mirror (M2);

an output optical path of the third quarter-wave plate (QWP3) is provided with a first photodetector (PDm);

an output optical path of the fourth quarter-wave plate (QWP4) is provided with a second photodetector (PDr);

polarization axis directions of the third polarizer (POL3) and the fourth polarizer (POL4) are both non horizontal and non vertical; fast axis directions of the first quarter-wave plate (QWP1) and the second quarter-wave plate (QWP2) are parallel, and the fast axis directions of the first quarter-wave plate (QWP1) and the second quarter-wave plate (QWP2) are not parallel and not perpendicular to a horizontal transmission polarization direction of the first polarization beam splitter (PBS1) or the second polarization beam splitter (PBS2);

the first polarization beam splitter (PBS1) and the second polarization beam splitter (PBS2) have the same size and are symmetrically mirrored with respect to the half-wave plate (HWP);

the first measurement beam and the second reference beam, as well as the second measurement beam and the first reference beam, have equal travel path lengths in the integrated dual polarization beam-splitting assembly.

5. A measurement method for a heterodyne laser interferometer based on an integrated dual polarization beam-splitting assembly, wherein the heterodyne laser interferometer is the heterodyne laser interferometer based on the integrated dual polarization beam-splitting assembly according to claim 4;

the measurement method comprises the following steps:

after the first input beam is incident on the first polarization beam splitter (PBS1), a transmitted beam of the first input beam forms a first measurement beam, and a reflected beam of the first input beam forms a first reference beam;

after the second input beam is incident on the second beam splitter (PBS2), a transmitted beam of the second input beam forms a second measurement beam, and a reflected beam of the second input beam forms a second reference beam;

the first measurement beam continues to transmit under polarization state transformation of the first quarter-wave plate (QWP1) and reaches the first target mirror (M1), then carries a Doppler frequency shift and is output by reflection at the first polarization beam splitter (PBS1);

the second measurement beam continues to transmit under polarization state transformation of the second quarter-wave plate (QWP2) and contacts the second target mirror (M2), then carries a Doppler frequency shift and is output by reflection at the second polarization beam splitter (PBS2);

at the same time, the first reference beam is transmitted and outputted through the first polarization beam splitter (PBS1) under polarization state transformation of the half-wave plate (HWP);

the second reference beam is transmitted and outputted through the second polarization beam splitter (PBS2) under the polarization state transformation of the half-wave plate (HWP), and the frequencies of the first reference beam and the second reference beam remain unchanged;

at least a portion of the output first measurement beam and the output second reference beam recombine to form a first interference signal (Im) in an output travel path, and at least a portion of the first reference beam and the second measurement beam recombine to form the second interference signal (Ir) in the output travel path;

finally, the first photodetector (PDm) receives the first interference signal (Im), the second photodetector (PDr) receives the second interference signal (Ir), and position change information of target plane mirrors at different degrees of freedom is obtained after conducting signal processing on the first interference signal (Im) and the second interference signal (Ir).

\* \* \* \* \*